United States Patent [19]

Itatani et al.

[11] 3,895,055

[45] July 15, 1975

[54] COUPLING PROCESS OF AROMATIC COMPOUNDS

[75] Inventors: Hiroshi Itatani; Hataaki Yoshimoto, both of Chiba, Japan

[73] Assignee: Ube Industries, Ltd., Yamaguchi, Japan

[22] Filed: Dec. 10, 1971

[21] Appl. No.: 206,950

[30] Foreign Application Priority Data
Dec. 22, 1970   Japan.............................. 115123/70

[52] U.S. Cl... 260/479 R; 260/488 CD; 260/613 R; 260/645; 260/649 DP; 260/670
[51] Int. Cl....................... C07c 69/14; C07c 15/14
[58] Field of Search........................ 260/479 R, 670

[56] References Cited
UNITED STATES PATENTS 3,493,605   2/1970   Selwitz............................... 260/488
3,644,486   2/1972   Boldt et al. .......................... 260/479
3,651,127   3/1972   Hornig et al........................ 260/479

OTHER PUBLICATIONS

Van Helden et al., Recueil, Vol. 84, (1965), p. 1268.
Davidson et al., March, 1966, p. 457.
Davidson et al., August, 1967, p. 1361.
Davidson et al., J. Chem. Soc. (Sect. A), (1968), pp. 1331–1334.

*Primary Examiner*—James A. Patten
*Attorney, Agent, or Firm*—Henderson, Farabow & Garrett Finnegan

[57] ABSTRACT

Oxydative coupling process of aromatic compounds having at least two hydrogen atoms in the aromatic nucleus, characterized by that the aromatic compounds are dehydrogenated in oxygen or oxygen-containing gas under pressure in the presence of an organic palladium compound as a catalyst.

7 Claims, No Drawings

COUPLING PROCESS OF AROMATIC COMPOUNDS

This invention relates to a process for obtaining oxydative coupling compounds with excellent efficiency by oxydative coupling of aromatic compounds.

This invention more particularly relates to an oxydative coupling process of aromatic compounds, wherein aromatic compounds having at least two hydrogen atoms in the aromatic nucleus are dehydrogenated in oxygen or oxygen-containing gas under pressure in the presence of an organic palladium compound as a catalyst.

Heretofore it has been known that aromatic compounds, for example, toluene, are oxydatively coupled in the presence of palladium salts such as palladium chloride, palladium acetate, mixed with acetic acid and sodium acetate to obtain bitolyls (refer to R. Van. Helden and G. Verberg: Rec. Trav. chim 84,1263 (1965) and J. M. Davidson and C. Triggs: J. Chem. Soc., (A), 1331 (1968) ).

When employing these known processes, however, there are such disadvantages that the yield of bitolyl is very low and that palladium black is precipitated in the reaction system (metallic black).

Another process, for example, disclosed in the Japanese Official Gazette (Japanese Patent Publication No. 26717/1964), describes the process for producing 3, 3', 4, 4'-tetramethyl-biphenyl, biphenyl or diisopropylbiphenyl, wherein aromatic compounds, for example o-xylene, benzene or cumene, react with palladium or platinum salts in the presence of salts of alkali metals and organic acid.

The said process, however, depends on the reaction of aromatic compounds and platinum or palladium salts and therefore the yield of coupling compounds obtained is less than 100 mol per cent based on palladium or platinum salts. Further, there is such a disadvantage that a large portion of palladium salt or platinum metal precipitates in the reaction system. Therefore it is impossible to obtain a high yield of coupling compounds according to said process.

The present invention is an improvement in regard to the inventors' previous study that the coupling reaction can be oxydatively attained leaving no Pd-black in the system by reacting aromatic hydrocarbons with olefines in an atmosphere where the partial pressure of oxygen is higher than 2 kg/cm$^2$, in the presence of catalytically reacting Pd-salts. (Refer to Japanese Patent application No. 92041/68).

According to the present invention aromatic compounds are oxydatively coupled by the use of organic palladium compounds and the coupling compounds can be produced with excellent yields; furthermore, the precipitation of palladium black can be prevented and the oxydative coupled aromatic compounds can be produced with surprisingly high yields without any further additives such as sodium acetate to the reaction system.

Thus, this invention provides a process which comprises oxydatively coupling aromatic compounds having at least two hydrogen atoms in the aromatic nucleus, under elevated pressure of oxygen or oxygen-containing gas in the presence of an organic palladium compound as a catalyst.

According to the present invention, it is particularly important that the coupling reaction shall be carried out in oxygen gas or oxygen-containing gas under an elevated pressure. If the pressure conditions are not met an oxydative coupling reaction is hardly possible to take place.

For this invention, it is preferable to carry out the reaction under the partial oxygen pressure of 5 – 300 kg/cm$^2$, preferably 5 – 40 kg/cm$^2$. Under a pressure below 5 kg/cm$^2$ the reaction does not proceed and if the pressure exceeds 300 kg/cm$^2$, there is no increase in yield.

Therefore, it is not practical to cause the reaction to take place under a partial oxygen pressure higher than the above mentioned pressure.

Oxygen gas used for the present invention may be elemental oxygen, but it is preferable, for the prevention of an explosion, to use it mixed with an inert gas such as nitrogen gas, carbon dioxide gas and/or rare gas, such as air.

In the presence of any compounds other than the organic palladium salt like sodium acetate, potassium acetate, lithium chloride, potassium nitrate, lithium nitrate, potassium sulfate, acetic acid, sulfuric acid, polar solvent such as dimethylformamide and acetonitrile and water, the amount of the coupled product obtained by oxydation is extremely small or can not be produced at all and in some cases an explosion occurs during the reaction. Likewise, even if aliphatic olefines like cyclo-octadiene or cyclo-dodecatriene is used for the reaction system mentioned above, the reaction does not proceed at all.

Therefore, it is essential that the reaction be carried out without any of said compounds being present. Further, through the employment of some additives, for example, $\beta$-diketones such as acetylacetone, benzoylacetone, trifluoroacetone, hexafluoroacetylacetone and benzoyltrifluoroacetone in the reaction system, the yield of the coupling compounds can be greatly improved.

In case that the coupling reaction is carried out in an autoclave made of stainless steel or steel, some metal salts like iron, nickel or chromium salt will precipitate, thereby preventing the oxydative coupling reaction from taking place. The use of ethylenediaminetetraacetic acid as an additive can promote the reaction effectively.

The amount of the additive such as $\beta$-diketones, ethylenediaminetetraacetic acid is 0.5 – 4 moles based on the organic palladium compound, more preferably in equal molarity.

The catalyst used in this invention should be an organic palladium compound. In order to produce oxydative coupling compounds with excellent yield, it is desirable to use aliphatic monocarboxylic acid salts having 1 – 5 carbon atoms, like palladium formate, palladium acetate palladium propionate, palladium butyrate, palladium valerate, etc. It is also preferable to use palladium benzoate, palladium acetylacetonate, bis-dibenzylideneacetone palladium etc. Particularly palladium acetate is preferable.

According to this invention, it is not desirable to use inorganic palladium salts such as palladium chloride, nor a mixture of palladium chloride and sodium acetate etc.

The amount of palladium salt catalyst used in this invention is 1/10 – 1/10000 mol based on the aromatic compounds and more preferably 1/200 – 1/2000 mol.

Because palladium black does not precipitate in the reaction system during the coupling reaction of the aromatic compounds, the organic palladium compounds can be easily recovered and regenerated according to the process of the present invention. For example, the atmosphere in the autoclave is substituted with nitrogen gas after the reaction and then filled up with hydrogen gas, reducing thereby the palladium salt contents in the reaction solution and precipitating palladium black. Then the palladium black is dissolved in nitric acid, the solution filtered and acetic acid, propionic acid etc. are added.

The aromatic compounds used in the process of the invention should have at least two hydrogen atoms in the aromatic nucleus. These aromatic compounds are represented by the following general formula:

(wherein R is selected from the group consisting of hydrogen atom, alkyl having 1 – 5 carbon atoms, alkanoyloxy having 1 – 5 carbon atoms, alkoxy having 1 – 5 carbon atoms, substituted alkyl (the substituted group is selected from acetyl and halogen), nitro- and halogen, n is 0 – 4 but when n is 2 – 4, R may be the same or a different substituent from n.

Aromatic compounds represented by the general formula are, for example, benzene, toluene, o-, m- or p-xylene, ethylbenzene, 1,2,4-trimethylbenzene, chloromethylbenzene, chlorobenzene, fluorobenzene, anisole, nitrobenzene, o-, m-, p- nitrotoluene, o-chlorotoluene, 2,6-dimethylbenzylacetate, xylylenediacetate, trifluorotoluene, phenylacetate, methylacetylsalicylate and the like.

The aromatic compound used for the process of the present invention is an aromatic compound having at least two hydrogen atoms in the aromatic nucleus. A substituted group R having active hydrogen in the form of —OH, —NH$_2$, —COOH is not preferred.

With respect to the reaction temperature, it is preferable that the reaction process is carried out at a temperature ranging from room temperature to 300°C, especially from 100° to 200°C, though it varies depending on the aromatic compound used and the partial pressure of oxygen in the reaction system.

The recovery from the reaction solution of compounds which have not been coupled by oxidation is effected easily in a conventional way, for example by the evaporation process of the reaction solution.

According to the present invention, for example tetramethylbiphenyl can be obtained with excellent yield from o-xylene and then the resulting coupling compound is oxidized and finally biphenyltetracarboxylic acid can be obtained. The resultant carboxylic acid is very useful as a raw material for compounds such as polyimide, epoxy resin, hardener, polyester, dye, etc.

Thus the coupling reaction according to the process of the present invention has great advantages in commercial fields.

The present invention is further illustrated by the following examples, which are given for illustration of the invention only and not to limit the scope thereof, all of which is limited only by the claims hereinafter stated.

EXAMPLE 1

50 ml of toluene and 0.112 g (0.5 m mol) of palladium acetate were introduced into a stainless steel autoclave of 150 ml capacity of the electromagnetically agitating type and pure oxygen gas was introduced into the autoclave till the inner pressure thereof reached 50 kg/cm$^2$.

Then the oxydative coupling reaction of toluene was carried out at 140°C for 4 hours.

After the reaction, the reaction solution in the autoclave was analyzed by means of gas-chromatography. 2.79g of bitolyl (yield of 3,060 mol % based on palladium acetate), 0.02g of benzylacetate (yield of 30 mol % based on palladium acetate) and 0.04g of dibenzyl (yield of 45 mol % based on palladium acetate) were obtained.

The reaction solution was concentrated in an oil bath at 130°C. Then precipitates were separated from it. The filtered solution was concentrated on the oil bath at 100°C under reduced pressure. Thus 5.65g of brown liquid was obtained. After distillation under reduced pressure, 2.40g of bitolyl (yield of 2,640 mol % based on palladium acetate) was obtained.

6 types of isomers were observed in the bitolyl obtained and the percentages thereof were as follows, o,o'- 1.9%, o,m'- 14.8%, o,p'- 10.5%, m,m'- 29.6%, m,p'- 34.0% and p,p'- 9.2%, respectively.

Precipitation of palladium black was not observed after the reaction.

Control 1

An oxydative coupling reaction of toluene was carried out under the same conditions as those of Example 1, except that the pressure of oxygen was atmospheric pressure. No oxydative coupling reaction did occur.

Control 2

0.5ml of toluene, 0.21g of palladium acetate, 1.0g of sodium acetate and 8ml of acetic acid were introduced into the same autoclave as in Example 1, and pure oxygen gas was introduced into the autoclave till the inner pressure thereof reached 100 kg/cm$^2$.

Then oxydative coupling reaction was carried out at 100°C for 4 hours.

After the reaction, the reaction solution in the autoclave was treated in the same way as in Example 1 and 0.14g of bitolyl (yield of 82 mol % based on palladium acetate) was obtained.

Control 3

100 ml of toluene, 0.22g of palladium acetate and 0.10g of sulfuric acid were introduced into the same autoclave as in Example 1 and a gaseous mixture of nitrogen and oxygen (1 : 1 mol ratio) was introduced into the autoclave till the inner pressure thereof reached 50 kg/cm$^2$.

Then an oxydative coupling reaction was carried out at 150°C for 6 hours.

After the reaction, the reaction solution in the autoclave was treated in the same way as in Example 1 but no more than a trace of bitolyl was obtained.

EXAMPLE 2

A glass vessel containing 50 ml of toluene and 0.112g of palladium acetate was placed in a stainless autoclave of the shaking type (300 ml capacity) and a gaseous mixture of nitrogen and oxygen (1:1 mol ratio) was introduced into the autoclave till the inner pressure thereof reached 50 kg/cm$^2$, and an oxydative coupling reaction was carried out at 120°C for 4 hours.

After the reaction, the reaction solution in the autoclave was treated in the same way as in Example 1 and 1.65g of bitolyl (yield of 1,812 mol % based on palladium acetate) was obtained.

Control 4

An oxydative coupling reaction of toluene was carried out under the same conditions as those in Example 2 except that 0.112g (0.5m mol) of palladium nitrate instead of palladium acetate was used.

No bitolyl was obtained.

Control 5

An oxydative coupling reaction of toluene was carried out under the same conditions as those in Example 2 except that palladium chloride (0.5m mol) and potassium acetate (2.5m mol) were used instead of palladium acetate.

As a result, 185 mol % of bitolyl based on palladium was formed.

EXAMPLES 3–6

An oxydative coupling reaction of toluene was carried out under the same conditions as those in Example 2 except that a gaseous mixture of nitrogen and oxygen (1:1 mol ratio) was introduced till the inner pressures of the autoclave reached the various pressures shown in Table 1.

After the reaction, the reaction solution was treated in the same way as in Example 1, and the results shown in Table 1 were obtained.

Table 1

| Example | pressure in autoclave(kg/cm$^2$) | yield of bitolyl based on palladium acetate (mol %) |
|---|---|---|
| 3 | 6 | 112 |
| 4 | 12.5 | 498 |
| 5 | 25 | 757 |
| 6 | 75 | 1,801 |

EXAMPLE 7

An oxydative coupling reaction of o-nitrotoluene was carried out under the same conditions as those in Example 2 except that 50ml of o-nitrotoluene was used instead of toluene.

After the reaction, the reaction solution was treated in the same way as in Example 1 and 3.01g of dimethyldinitrobiphenyl (yield of 2,210 mol % based on palladium acetate) was obtained.

EXAMPLE 8

An oxydative coupling reaction of anisole was carried out at 130°C for 8 hours under the same conditions as in Example 2 except that 50ml of anisole instead of toluene was used.

As a result, the yield of dimethoxybiphenyl was 2,050 mol % based on palladium acetate.

EXAMPLE 9

An oxydative coupling reaction of p-xylene was carried out at 150°C for 12 hours under the same conditions as in Example 2 except that 50ml of p-xylene instead of toluene was used.

As a result, the yield of tetramethylbiphenyl was 1,420 mol percent based on palladium acetate.

EXAMPLE 10

An oxydative coupling reaction of toluene was carried out at 150°C for 5 hours under the same conditions as in Example 2 except that 0.5m mol of palladium benzoate instead of palladium acetate was used.

As a result, the yield of bitolyl was 3,400 mol % based on palladium benzoate.

EXAMPLE 11

An oxydative coupling reaction of o-chlorotoluene was carried out at 150°C for 5 hours under the same conditions as in Example 2 except that 50ml of o-chlorotoluene instead of toluene was used.

As a result, the yield of dichlorobitolyl was 1,520 mol % based on palladium acetate.

EXAMPLE 12

A 1,000ml glass vessel containing 0.224g (1m mol) of palladium acetate, 300ml of toluene and 0.1g of acetylacetone was placed in an autoclave, a gaseous mixture of nitrogen and oxygen (1:1 mol ratio) was introduced into the vessel and an oxydative coupling reaction was carried out at 150°C under the pressure of 65 kg/cm$^2$ for 16 hours.

The reaction solution was treated in a similar way to Example 1 and 30.8g of bitolyl (yield of 16,900 mol % based on palladium acetate) was obtained.

EXAMPLE 13

An oxydative coupling reaction of benzylacetate was carried out under the same conditions as in Example 1, except that 50ml of benzylacetate instead of toluene was used.

The reaction product was treated in the same way as in Example 1 and the yield of diacetoxymethylbiphenyl was 2,000 mol % based on palladium acetate.

EXAMPLE 14

A 300ml glass vessel containing 50ml of benzene, 0.112g (0.5m mol) of palladium acetate and 0.050g of acetylacetone was placed in a stainless steel shaking type autoclave, a gaseous mixture of nitrogen and oxygen (1:1 mol ratio) was introduced into the autoclave till the pressure reached 50 kg/cm$^2$, and an oxydative coupling reaction was carried out at 150°C for 4 hours.

After the reaction, the reaction solution in the autoclave was analyzed by means of gas-chromatography and the yield of biphenyl was 3,050 mol % based on palladium acetate.

EXAMPLES 15–23

Oxydative coupling reactions were carried out in a similar way to Example 14, except that toluene, o-xylene, m-xylene, p-xylene, trifluorobenzene, chlorobenzene, trifluoromethyl-benzene, nitrobenzene, phenylacetate, were used instead of benzene.

After the reactions, the reaction solutions were treated in the same way as in Example 1, and the results shown in Table 2 were obtained.

Table 2

| No. of Example | aromatic compound | coupled compound | yield of coupled compound based on palladium acetate (mol %) |
|---|---|---|---|
| 15 | toluene | bitolyl | 7,410 |
| 16 | o-xylene | tetramethyl-biphenyl | 5,670 |
| 17 | m-xylene | tetramethyl-biphenyl | 4,130 |
| 18 | p-xylene | tetramethyl-biphenyl | 400 |
| 19 | fluorobenzene | difluorobiphenyl | 2,330 |
| 20 | chlorobenzene | dichlorobiphenyl | 420 |
| 21 | (trifluoromethyl)benzene | bis(trifluoromethyl)biphenyl | 660 |
| 22 | nitrobenzene | dinitrobiphenyl | 2,470 |
| 23 | phenylacetate | diacetoxybiphenyl | 5,720 |

EXAMPLES 24–31

300ml of o-xylene and organic palladium compounds shown in Table 3, together with an additive were introduced into a stainless steel autoclave of 1,000ml capacity, gaseous mixture of nitrogen and oxygen (1 : 1 mol ratio) was introduced into it till the pressure reached 50 kg/cm$^2$, and an oxydative coupling reaction was carried out at 150°C for 7 hours.

After the reaction, the solution was treated in a similar way to Example 1 and was analyzed by means of gas-chromatography, thus tetramethylbiphenyl was obtained as shown in Table 3.

Table 3

| Example | organic palladium compound (m mol) | additive (m mol) | yield of tetramethyl biphenyl based on the organic palladium compound (mol %) |
|---|---|---|---|
| 24 | palladium acetate (3) | none | 3,200 |
| 25 | palladium acetate (3) | acetyl acetone (6) | 6,700 |
| 26 | palladium acetate (3) | ethylenediamine tetra-acetic acid (3) | 4,600 |
| 27 | palladium acetyl acetonate (3) | none | 5,200 |
| 28 | bisbenzylidene-acetone palladium (3) | none | 5,800 |
| 29 | palladium acetate (3) | trifluoroacetyl-acetone (6) | 4,300 |
| 30 | palladium propionate (2) | none | 2,900 |
| 31 | palladium benzoate (2) | none | 3,000 |

Control 6
300ml of o-xylene, 2m mols of palladium acetate and 2m mols of sulfuric acid were introduced into the autoclave in a similar way to Example 24 and a reaction was carried out, but no coupled compound was obtained.

Controls 7, 8
Dimethylformamide or cyclooctadiene was used instead of sulfuric acid in the Example 24 and the results of the reaction are shown in Table 4.

Table 4

| Control | palladium compound (m mol) | additive (m mol) | yield of tetramethyl-biphenyl based on organic palladium compounds (mol %) |
|---|---|---|---|
| 7 | palladium acetate (2) | dimethyl-formamide (100) | 0 |
| 8 | palladium acetate (2) | cyclo-octadiene (100) | 0 |

What is claimed is:

1. A catalytic coupling process which comprises dehydrogenatively coupling a reactive aromatic compound having at least two hydrogen atoms in the aromatic nucleus and represented by the following general formula:

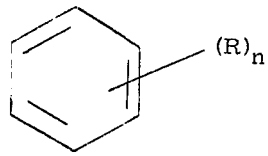

wherein R is selected from the group consisting of a hydrogen atom, alkyls having 1 to 5 carbon atoms, alkanoyloxy having 1 to 5 carbon atoms, alkoxys having 1 to 5 carbon atoms, acetyl or halogen substituted alkyl, nitro and halogen, and $n$ is 0 to 4, under the pressure of a gas selected from the group consisting of oxygen and oxygen-containing gas in the presence of an organic palladium compound and a member selected from the group consisting of β-diketone and ethylenediamine-tetraacetic acid in the amount of 0.5 to 4 mols based on the organic palladium compound, in the absence of a compound selected from the group consisting of sodium acetate, potassium acetate, lithium chloride, potassium nitrate, lithium nitrate, potassium sulfate, acetic acid, sulfuric acid, a polar solvent and water, the partial pressure of the oxygen being at least about 5 kg/cm$^2$.

2. A process of claim 1, wherein the oxygen-containing gas is selected from the group consisting of mixtures of elemental oxygen and nitrogen gas, carbon dioxide and rare element gases.

3. A process of claim 1, wherein the partial pressure of oxygen is within the range of 5 to 300 kg/cm$^2$.

4. A process of claim 1, wherein the organic palladium compound is selected from the group consisting of an organic palladium salt of aliphatic monocarboxylic acid having 1 - 5 carbon atoms, palladium benzoate, palladium acetylacetonate and bisdibenzylideneacetone palladium.

5. A process of claim 4, wherein the concentration of the organic palladium compound is 1/10 to 1/10.000 mol based on the aromatic compounds.

6. A process of claim 1, wherein the aromatic compound is selected from the group consisting of toluene, o-xylene, nitrobenzene, phenyl acetate, and fluorobenzene.

7. A process of claim 1, wherein the aromatic compound is coupled at a reaction temperature within the range from room temperature to 300°C.

\* \* \* \* \*